Aug. 9, 1932.   W. SCHAAKE   1,871,239

CURRENT COLLECTOR

Filed Dec. 19, 1930

WITNESSES:
R. S. Williams
N. S. Chilcott

INVENTOR
William Schaake.
BY
Wesley G. Carr
ATTORNEY

Patented Aug. 9, 1932

1,871,239

UNITED STATES PATENT OFFICE

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA

CURRENT COLLECTOR

Application filed December 19, 1930. Serial No. 503,397.

My invention relates to current collectors for railway vehicles and more particularly to current collectors for vehicles of the mono-rail type.

An object of my invention, generally stated, is to provide a current collector, suitable for use on mono-rail vehicles, which shall be simple and efficient in operation and that may be economically manufactured and installed.

A more specific object of my invention is to provide a current collector for a mono-rail vehicle which shall permit of lateral movement of the vehicle frame relative to a supply conductor, and maintain a predetermined contact area between the current collector and the supply conductor.

Other objects of the invention will appear as the specification proceeds.

For a fuller understanding of the nature and scope of the invention, reference may be had to the following detailed description, taken in conjunction with the accompanying drawing in which.

Figure 1:
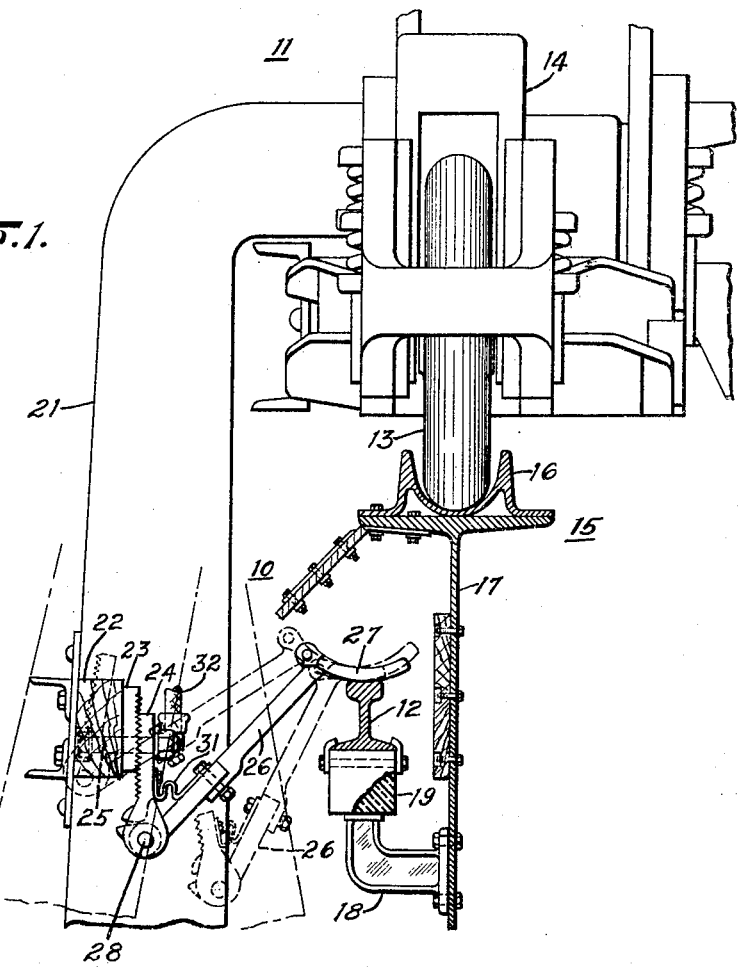
Figure 1 is a view, partially in elevation and partially in section, illustrating a current collector constructed in accordance with my invention.

Referring to the drawing, 10 designates, generally, a current-collecting device which is mounted upon an electric vehicle 11, of the mono-rail type, and disposed to engage a supply conductor 12.

Since the construction of the electric vehicle 11 is not a part of my invention, only a portion of the vehicle, comprising a wheel 13 and supporting frame 14, is illustrated. The vehicle 11 may be mounted upon an elevated track 15, which comprises a grooved rail 16 supported by a framework 17, only a portion of which is shown.

The supply conductor 12 extends parallel to the rail 16 and is supported by means of brackets 18 which are mounted on the supporting frame 17. The supply conductor 12 is insulated from the bracket 18 by a block of insulating material 19.

As illustrated, the current collector 10 may be mounted upon a downwardly extending portion 21 of the vehicle frame 14. A horizontally extending arm 22 is rigidly connected to the frame 21 for the purpose of supporting the current collector 10.

It will be understood that, in the operation of mono-rail vehicles, a certain amount of side-swaying will result from unequal distribution of the load or when going around curves. It is, therefore, necessary to provide a means of maintaining the current collector in engagement with the supply conductor when the side-swaying of the vehicle frame takes place.

With a view to permitting lateral movement of the vehicle frame 21 and the supporting arm 22 relative to the supply conductor 12, caused by the swaying of the vehicle frame, the current collector 10 is pivotally mounted on the arm 22, as illustrated in Fig. 1.

In order that the position of the current collector 10, mounted on the arm 22, may be adjusted vertically, a plate 23, having a serrated face, is connected to the arm 22. A bifurcated plate 24, which also has a serrated face, is disposed to engage the plate 23. The plates 23 and 24 are so clamped together by means of bolts 25 that the relative position of the plates may be readily changed by loosening the bolts 25.

As shown, a contact-carrying arm 26, which carries a contact shoe 27, is pivotally connected to the bifurcated plate 24 by means of a pin 28, which extends through openings provided in the bifurcated portion of the plate 24.

It will be observed that the surface of the contact shoe 27, which engages the supply conductor 12, is curved, thereby permitting the angle of the arm 26 with respect to the supply conductor 12 to be varied without varying the contact area between the shoe 27 and the supply conductor 12. In this manner, a sufficient amount of contact area is maintained between the shoe and the conductor for conducting the current required to operate the vehicle motors without overheating the collecting shoe 27.

Figure 2:
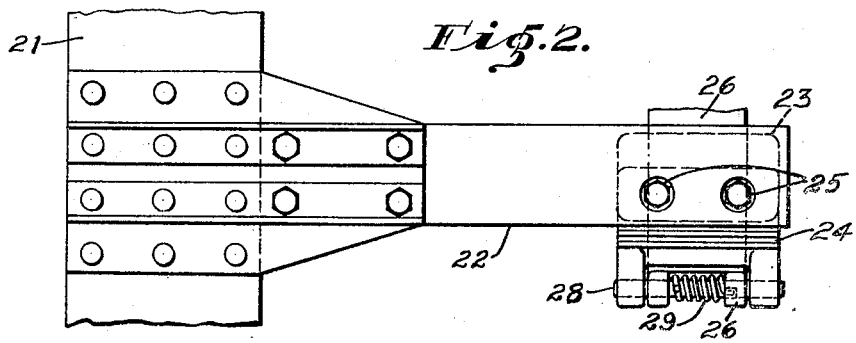
Fig. 2 is a view, in side elevation, of a portion of the equipment shown in Fig. 1.

In order to bias the contact shoe 27 into engagement with the supply conductor 12, a spring 29 is interposed between the contact-carrying arm 26 and the bifurcated plate 24, as shown in Fig. 2. The spring is so connected to the arm 26 and the pin 28 that the arm is biased downwardly, thereby keeping the shoe 27 in contact with the supply conductor 12.

A flexible shunt 31 may be provided for conducting current from the arm 26 to the plate 24, in order to prevent pitting of the bearing surfaces between the arm 26 and the pin 28. As shown in Fig. 1, a conductor 32 may be connected to the plate 24 to conduct the current to the vehicle motors (not shown).

As previously explained, the frame 21 may move laterally with respect to the track 15 and the supply conductor 12, when the vehicle 11 is in operation. Various positions of the current collector 10, resulting from the swaying of the frame 21, are illustrated by the broken lines in Fig. 1.

It will be seen that, on account of the pivotal mounting provided for the arm 26 and the curved construction of the shoe 27, a predetermined amount of contact surface will be maintained between the shoe 27 and the supply conductor 12 for various positions of the vehicle frame. In this manner, a satisfactory method of collecting current for operating a mono-rail vehicle is provided.

I do not desire to be restricted to the specific embodiment of my invention herein shown and described since it is evident that it may be changed and modified without departing from the spirit and scope of my invention, as defined in the appended claims.

I claim as my invention:

1. A current collector for collecting current from a supply conductor comprising a supporting arm, a bifurcated plate adjustably attached to the supporting arm, a contact-carrying arm pivotally mounted on the bifurcated plate and disposed at an oblique angle to the plate, a contact shoe mounted on the contact-carrying arm and disposed to engage the top side of the supply conductor, and resilient means interposed between the contact-carrying arm and the bifurcated plate to bias the contact shoe into engagement with the supply conductor.

2. A current collector for collecting current from a supply conductor comprising a supporting arm, a bifurcated plate adjustably attached to the supporting arm, a contact-carrying arm pivotally mounted on the bifurcated plate and disposed at an oblique angle to the plate, a contact shoe mounted on the contact-carrying arm, said contact shoe having a curved surface disposed to engage the supply conductor, and resilient means disposed to bias the contact shoe into engagement with the supply conductor, whereby lateral movement of the supporting arm relative to the supply conductor is permitted.

3. In a mono-rail-electric vehicle, in combination, a supporting frame for the vehicle, a plate attached to the supporting frame, said plate having a serrated face, a current collector mounted upon the supporting frame and disposed to collect current from a supply conductor, said current collector comprising a bifurcated plate having a serrated face disposed to engage the serrated face of the plate attached to the supporting frame, a contact-carrying arm pivotally mounted on the bifurcated plate and disposed at an acute angle to the vehicle-supporting frame, a contact shoe mounted on the contact carrying arm, said contact shoe having a curved surface disposed to engage the supply conductor, and resilient means interposed between the bifurcated plate and the contact-carrying arm to bias the contact shoe into engagement with the supply conductor, whereby lateral movement of the vehicle-supporting frame relative to the supply conductor is permitted.

4. In a mono-rail-electric vehicle, in combination, a supporting frame for the vehicle, a plate attached to the supporting frame, said plate having a serrated face, a current collector mounted upon the supporting frame and disposed to collect current from a supply conductor, said current collector comprising a bifurcated plate having a serrated face adjustably engaging the serrated face of the plate attached to the supporting frame, a contact-carrying arm pivotally mounted on the bifurcated plate and disposed at an acute angle to the vehicle-supporting frame, a contact shoe carried by the contact-carrying arm, said contact shoe having a curved surface disposed to engage the supply conductor, a flexible shunt interposed between the contact-carrying arm and the bifurcated arm to conduct current from the contact-carrying arm to the bifurcated arm, and resilient means disposed to bias the contact shoe into engagement with the supply conductor, whereby lateral movement of the vehicle-supporting frame relative to the supply conductor is permitted.

5. The combination with a mono-rail-electric vehicle having a substantially vertical supporting frame, of a horizontal arm attached to the frame, a current collector carried by the arm and disposed to engage a supply conductor, said current collector comprising a pivotally-mounted contact-carrying arm adjustably secured to said horizontal arm and disposed at an acute angle to the vehicle supporting frame, a contact shoe mounted on the contact-carrying arm, said contact shoe having a curved surface disposed to engage the supply conductor, and resilient means for biasing the contact shoe into engagement with the supply conductor, whereby lateral movement of the vehicle-supporting frame relative to the supply conductor is permitted without the contact shoe becoming disengaged from the supply conductor.

6. A current collector for mono-rail-electric vehicles having a supporting frame which may move laterally with respect to a supply conductor comprising a horizontal arm attached to the vehicle supporting frame, a plate attached to the horizontal arm, said plate having a serrated face, a bifurcated plate having a serrated face adjustably mounted on the plate attached to the horizontal arm, a contact-carrying arm pivotally mounted on the bifurcated plate, said contact-carrying arm forming an oblique angle with the vehicle supporting frame, a contact shoe mounted on the contact-carrying arm, said contact shoe having a curved surface disposed to engage the supply conductor, and resilient means interposed between the bifurcated plate and the contact-carrying arm to bias the contact shoe into engagement with the supply conductor, whereby lateral movement of the vehicle supporting frame relative to the supply conductor is permitted without the contact shoe becoming disengaged from the supply conductor.

In testimony whereof, I have hereunto subscribed my name this 16th day of December, 1930.

WILLIAM SCHAAKE.